(12) United States Patent
Szymczak

(10) Patent No.: US 10,081,340 B2
(45) Date of Patent: Sep. 25, 2018

(54) STEERING BRAKE LOCKING SYSTEM

(71) Applicant: AGCO International GmbH, Hesston, KS (US)

(72) Inventor: Dominique Szymczak, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 158 days.

(21) Appl. No.: 15/222,350

(22) Filed: Jul. 28, 2016

(65) Prior Publication Data

US 2017/0036652 A1  Feb. 9, 2017

(30) Foreign Application Priority Data

Aug. 4, 2015  (EP) ..................................... 15290201
Aug. 18, 2015  (GB) .................................... 1514680.6

(51) Int. Cl.
| | | |
|---|---|---|
| *B60T 7/04* | (2006.01) | |
| *B60T 7/06* | (2006.01) | |
| *B60K 35/00* | (2006.01) | |
| *B60K 31/00* | (2006.01) | |
| *B60T 11/21* | (2006.01) | |
| *G05G 1/34* | (2008.04) | |

(52) U.S. Cl.
CPC .............. *B60T 7/045* (2013.01); *B60K 31/00* (2013.01); *B60K 35/00* (2013.01); *B60T 7/06* (2013.01); *B60T 11/21* (2013.01); *G05G 1/34* (2013.01); *B60T 2250/04* (2013.01)

(58) Field of Classification Search
CPC . B60T 7/045; B60T 7/06; B60T 11/21; G05G 1/34
See application file for complete search history.

(56) References Cited

U.S. PATENT DOCUMENTS

| 7,227,324 B2 * | 6/2007 | Erben ..................... B60T 7/045 318/362 |
| 2005/0016320 A1 * | 1/2005 | Porter ..................... B60T 7/045 74/512 |
| 2008/0223171 A1 * | 9/2008 | Fujiwara ............... G01L 1/2237 74/512 |

(Continued)

FOREIGN PATENT DOCUMENTS

| DE | 2362220 A1 | 6/1975 |
| DE | 3444323 A1 | 6/1986 |

(Continued)

OTHER PUBLICATIONS

Intellectual Property Office, International Search Report for related UK Application No. GB1514680.6, dated Feb. 26, 2016.

(Continued)

*Primary Examiner* — Faye M Fleming

(57) ABSTRACT

A steering brake locking system for a vehicle, such as an agricultural tractor, has at least first and second adjacent steering brake pedals, and a locking pin arranged to selectively lock the pedals together. The locking pin and at least a portion of the first and second pedals are formed from a conductive material, such that an electrically conductive path is formed between the first and second pedals through the locking pin when the pin is used to lock the pedals together. The locking status of the pedals can be determined by measuring the electrical conductivity between the first and second pedals.

15 Claims, 6 Drawing Sheets

(56) References Cited

U.S. PATENT DOCUMENTS

2015/0203144 A1* 7/2015 Kerler .................... B60T 11/21
                                                            280/88
2018/0037199 A1* 2/2018 Fujiwara ................ B60T 7/065

FOREIGN PATENT DOCUMENTS

EP          2376317 A1     1/2000
JP         H11115795 A     8/2008

OTHER PUBLICATIONS

European Patent Office, International Search Report for related European Application No. EP16 17 8910, dated Apr. 12, 2017.

* cited by examiner

STEERING BRAKE LOCKING SYSTEM

BACKGROUND OF THE INVENTION

Field of Invention

The present invention relates to a vehicle having a steering brake system, in particular a steering brake locking system for such a vehicle.

Description of Related Art

Some vehicles, and in particular agricultural tractors, are regularly provided with steering brake systems. Such systems generally comprise independent brake circuits for different wheels of the vehicle, e.g. left and right rear wheels, to allow the driver to brake only the inside wheel during a turning operation. This provides tighter turning circles, allowing for greater control of vehicle movement.

Such steering brake systems generally comprise separate brake pedals to separately control the braking actions of the different wheels. In addition, the pedals are often provided with a pedal locking system such that the pedals may be locked together for combined actuation of the wheel brakes. This avoids the risk of single wheel braking at high speeds, e.g. on a highway, which could result in undesired swerving of the vehicle. An example of a prior art steering brake system is provided in EP 2376317 B1, which describes the use of dedicated sensors to determine whether one or both brake pedals are actuated, and to indicate to a driver the unlocked state.

The new EU "Mother Regulation" requires increased control of vehicle braking systems, to reduce the risk of accidents. In a particular aspect, the Mother Regulation will require that the maximum speed of a vehicle is limited when steering brake pedals are unlocked, thereby eliminating the risk of single wheel braking at high speeds.

In an effort to satisfy the requirements of the Mother Regulation, it has been suggested to incorporate dedicated sensor systems, e.g. pressure switches, position sensors, optical detector switches, etc., into the design of the steering brake pedals, to detect the locking status of the pedals. Such dedicated sensor systems may then be provided with communication systems to communicate with the vehicle engine control unit (ECU) to regulate the vehicle operation.

However, the use of such dedicated sensor systems to detect locking status of brake pedals requires additional resources in the form of extra components for use in vehicle manufacture. Such components must be resilient enough to survive operational conditions in the area of the brake pedals, which may be exposed to a relatively high level of mud or other debris. In addition, the incorporation of such new sensor systems into existing pedal systems requires additional cab space to physically accommodate the new components, and/or redesign of the existing systems to incorporate the new sensor configuration.

OVERVIEW OF THE INVENTION

Accordingly, there is provided a steering brake system for a vehicle, the steering brake system comprising: adjacent first and second pedals; and a locking pin slidably mounted on said first pedal, said locking pin arranged to travel between an unlocked position where the locking pin is carried on said first pedal and a locked position where the locking pin extends from said first pedal into engagement with said second pedal to lock said first and second pedals together, wherein said first and second pedals and said locking pin are at least partially formed from a conductive material, such that the locking pin forms a conductive path between a conductive portion of said first pedal and a conductive portion of said second pedal when in said locked position, and wherein the steering brake system is configured such that the locked or unlocked position of the locking pin is determined by monitoring the electrical resistance between said first and second pedals.

By providing at least a portion of the pedals and the locking pin as a conductive material, accordingly an electrical circuit can be completed between the first and second pedals. Monitoring or measuring the electrical resistance of such a simple circuit provides a simple indication of the locking status of the pedals. If the locking pin is in the unlocked position, the pedals are unlocked and the locking pin does not complete the circuit, presenting the infinite resistance of an open circuit. If the locking pin is in engagement with the second pedal, the pedals are locked, and the circuit is closed, presenting a measurable electrical resistance. The steering brake system may comprise a dedicated pedal lock status module arranged to determine the locked or unlocked position of the locking pin by monitoring the electrical resistance between said first and second pedals.

Preferably, the first and second pedals comprise respective pedal bodies, wherein the pedal bodies are formed from a conductive material, e.g. a metal.

As the pedal bodies are formed from a conductive material, the pedal bodies themselves form part of the electric circuit used to monitor the electrical resistivity of the system. Accordingly, the number of components required to provide an accurate pedal lock monitoring system can be reduced.

Preferably, at least one of the first and second pedals are arranged to be electrically isolated from a vehicle to receive the steering brake system.

By electrically isolating one or both of the pedals of the steering brake system from the remainder of the vehicle, e.g. the vehicle frame or chassis, the resistivity between the pedals can be accurately monitored to determine the locking status of the system.

Preferably, the steering brake system comprises at least one mounting portion such that at least one pedal of the steering brake system can be mounted to a vehicle, wherein said mounting portion comprises an electrically-insulating component to electrically isolate said at least one pedal from the vehicle.

The electrically-insulating component may be formed from any suitable non-conductive material, e.g. a plastics material, a ceramic material, a natural or synthetic rubber material, etc.

Preferably, the steering brake system comprises at least one insulating bushing, formed of a non-conductive material.

Preferably, at least one of said first and second pedals comprises an insulating bushing received in an aperture defined in said at least one pedal, wherein said insulating bushing provides for a mounting of said at least one pedal to a vehicle.

In one aspect, said insulating bushing is arranged to receive a pivot pin or pivot shaft for pivotable mounting of the pedal to a vehicle.

In an alternative aspect, said insulating bushing is arranged to receive a bolt for the attachment of a support bracket to said at least one pedal, wherein said support bracket may be pivotably mounted to a vehicle.

Additionally or alternatively, the steering brake system is arranged to couple with at least one biasing spring provided on a vehicle such that said at least one biasing spring acts to bias at least one of said first and second pedals to an at-rest position, wherein the steering brake system comprises a connector arranged to couple with said at least one biasing spring, said connector formed of an insulating material.

As the biasing spring may be formed of a conductive material, e.g. a metal material, accordingly the use of an insulating connector serves to electrically isolate the brake pedal from the underlying vehicle structure.

Preferably, the steering brake system comprises at least one mounting flange for coupling at least one of said pedals with a brake cylinder of a vehicle, at least a portion of said mounting flange comprising an electrically-insulating material such that said at least one of said pedals is electrically isolated from said brake cylinder.

In one aspect of the invention, the steering brake system comprises a pedal lock sensor, wherein the pedal lock sensor monitors the electrical resistance between said first and second pedals to determine the position of said locking pin.

The pedal lock sensor may comprise a dedicated sensor system, arranged to receive as an input an electrical conductivity or resistivity measurement, and to output a signal indicating a locked or unlocked status of the steering brake system. The output signal is generated based on the level of measured electrical conductivity—a relatively low conductivity or high resistance, e.g. an open circuit or no conductivity, indicates an unlocked system, while a relatively high conductivity or low resistance, e.g. a closed electrical circuit, indicates a locked system. The pedal lock sensor may comprise a sensor arranged to monitor the level of electrical resistivity or electrical conductivity between the first and second pedals. In a further aspect, the electrical conductivity or resistivity between the pedals of the steering brake system may be monitored by a vehicle electronic control unit (ECU) or similar.

Preferably, the steering brake locking system comprises first and second terminals for measuring electrical resistance, the first terminal electrically connected to the conductive portion of said first pedal, the second terminal electrically connected to the conductive portion of said second pedal.

Measuring the electrical resistance seen across two terminals provides a simple and flexible method of monitoring the locking status of the pedals. The position and orientation of the two terminals may be selected based on the space restrictions of a vehicle, e.g. reduced space within a vehicle cab.

In one embodiment of the invention, the steering brake locking system comprises first and second conductive elements extending from electrically conductive portions of respective first and second pedals to respective first and second terminals.

Preferably, said first and second conductive elements comprise first and second insulated electrical wires. Such wires may be relatively easily incorporated into a vehicle design, without requiring extensive adjustment or re-design of existing pedal components. In addition, the wires may easily be provided as part of a retrofit solution for an existing vehicle design.

Preferably, the first pedal comprises at least one guide slot, wherein said locking pin is slidably mounted in said at least one guide slot to allow transverse movement of the locking pin.

Preferably, the second pedal comprises at least one receiving slot, wherein a first end of said locking pin is received in said at least one receiving slot when in said locked position.

In one aspect, said at least one receiving slot is formed from an electrically conductive material.

Preferably, the electrical resistance is measured from said at least one receiving slot.

In a further aspect, said at least one guide slot is formed from an electrically conductive material.

Preferably, the electrical resistance is measured from said at least one guide slot.

It will be understood that the at least one receiving slot and at least one guide slot may form the electrically conductive portions of the first and second pedals. It will be further understood that the slots may be integrally formed as part of the pedals, or may be provided as elements attached to the pedals. The steering brake system may also comprise supplemental electrical contact members provided on the first and/or second pedals, the supplemental electrical contact members used to form an electrical connection with the locking pin when in the locked and/or unlocked position.

Preferably, a notched cut is provided in said first end of said locking pin, such that the first end of said locking pin is compressed when received within the said at least one receiving slot.

By providing a notched end of the locking pin, the pin end can be compressed when inserted into the receiving slot. By designing this mechanical compression of the end of the pin during insertion, a mechanical and electrical connection between the receiving slot and the pin is ensured. In this regard, the insertion of the locking pin into the receiving slot provides a self-cleaning effect, which safeguards that any accumulated dirt or debris is cleared away from the connection between the pin and the receiving slot during insertion.

Preferably, a cross-shaped cut is provided in the first end of said locking pin.

Preferably, said at least one receiving slot comprises a chamfered surface facing the said first end of the locking pin, the chamfered surface dimensioned to compress the first end of locking pin when received within the said at least one receiving slot.

The use of a chamfered surface of the receiving slot ensures that the end of the locking pin comes into contact with the surface of the receiving slot during insertion, thereby providing for a guaranteed mechanical and electrical connection between the components when the pedals are locked together.

There is further provided a vehicle comprising a steering brake system as described above.

Preferably, the vehicle comprises an engine control unit (ECU), wherein the ECU is operable to control the maximum speed of said vehicle dependent on the locking status of said first and second pedals.

It will be understood that the ECU may be arranged to monitor the electrical resistivity between the first and second pedals, to determine the locking status of the first and second pedals.

Preferably, the ECU is operable to limit the maximum speed of said vehicle when said first and second pedals are unlocked. In one aspect, the maximum speed of the vehicle is limited to 40 km/h when the pedals are unlocked.

Preferably, said first and second terminals are located spaced from said first and second pedals.

Preferably, the vehicle comprises an engine control unit (ECU), wherein said first and second terminals are located close to the ECU.

In a further aspect, the vehicle comprises at least one display unit, wherein the ECU is arranged to display the determined locking status of the pedals on the display unit.

BRIEF DESCRIPTION OF THE DRAWINGS

Embodiments of the invention will now be described, by way of example only, with reference to the accompanying drawings, in which.

DETAILED DESCRIPTION OF THE INVENTION

It will be understood that the accompanying drawings are provided as representative diagrammatic figures, and are not to scale. In addition, as electrical conductivity is the reciprocal of electrical resistivity, it will be understood that the use of one or other of these terms is not limiting, and that both may be used to refer to the operation of the system of the invention.

Figure 1:
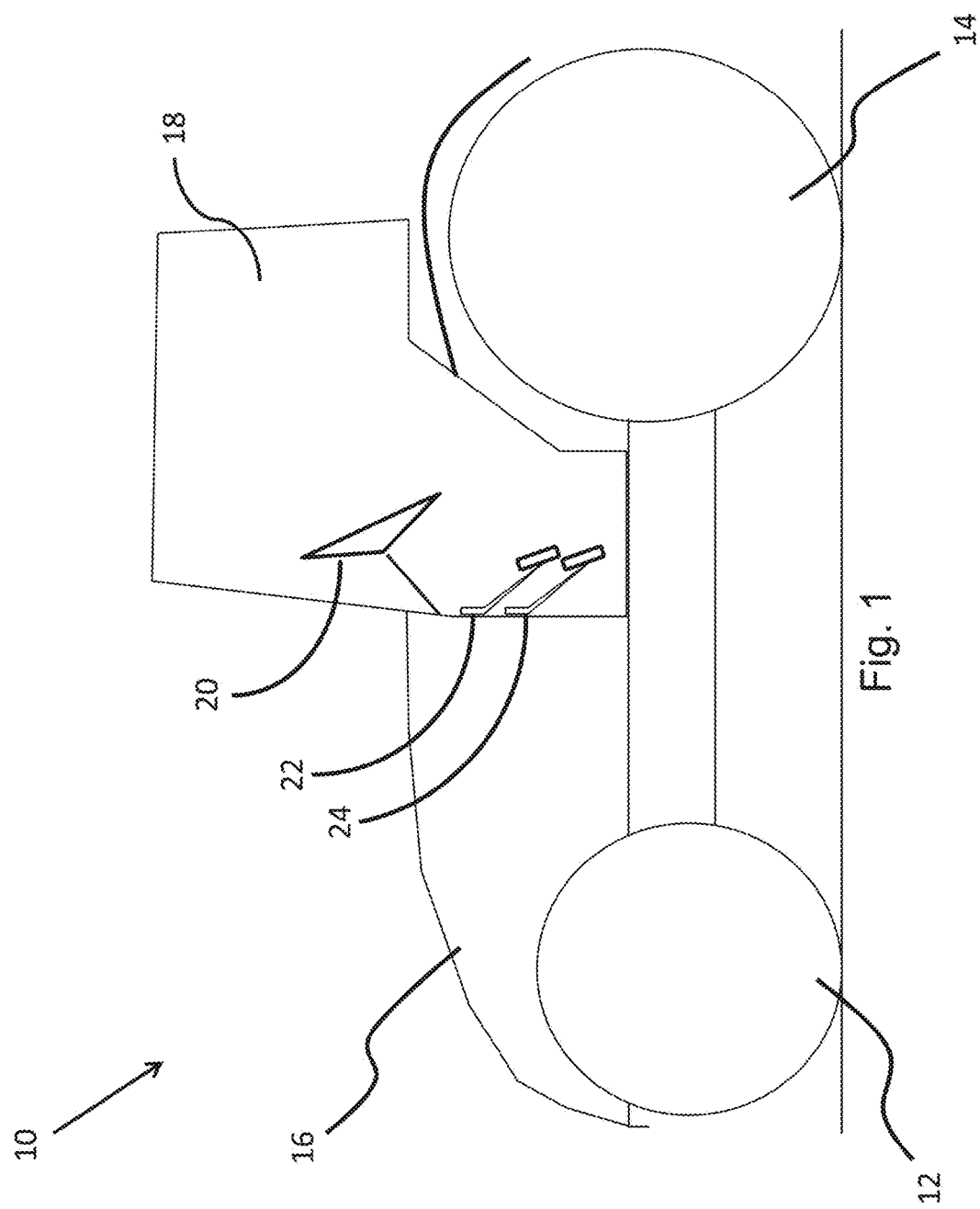
FIG. 1 is an illustration of an agricultural tractor.

With reference to FIG. 1, a vehicle according to the invention in the form of an agricultural tractor is indicated at 10. The tractor 10 comprises front wheels 12 and rear wheels 14, a forward engine section 16 and a cab section 18. A steering wheel 20 is provided in the cab 18, along with first and second brake pedals 22, 24. The brake pedals 22, 24 are used to control the braking of the tractor 10, in particular to control the separate braking of the rear wheels 14.

Figure 2:
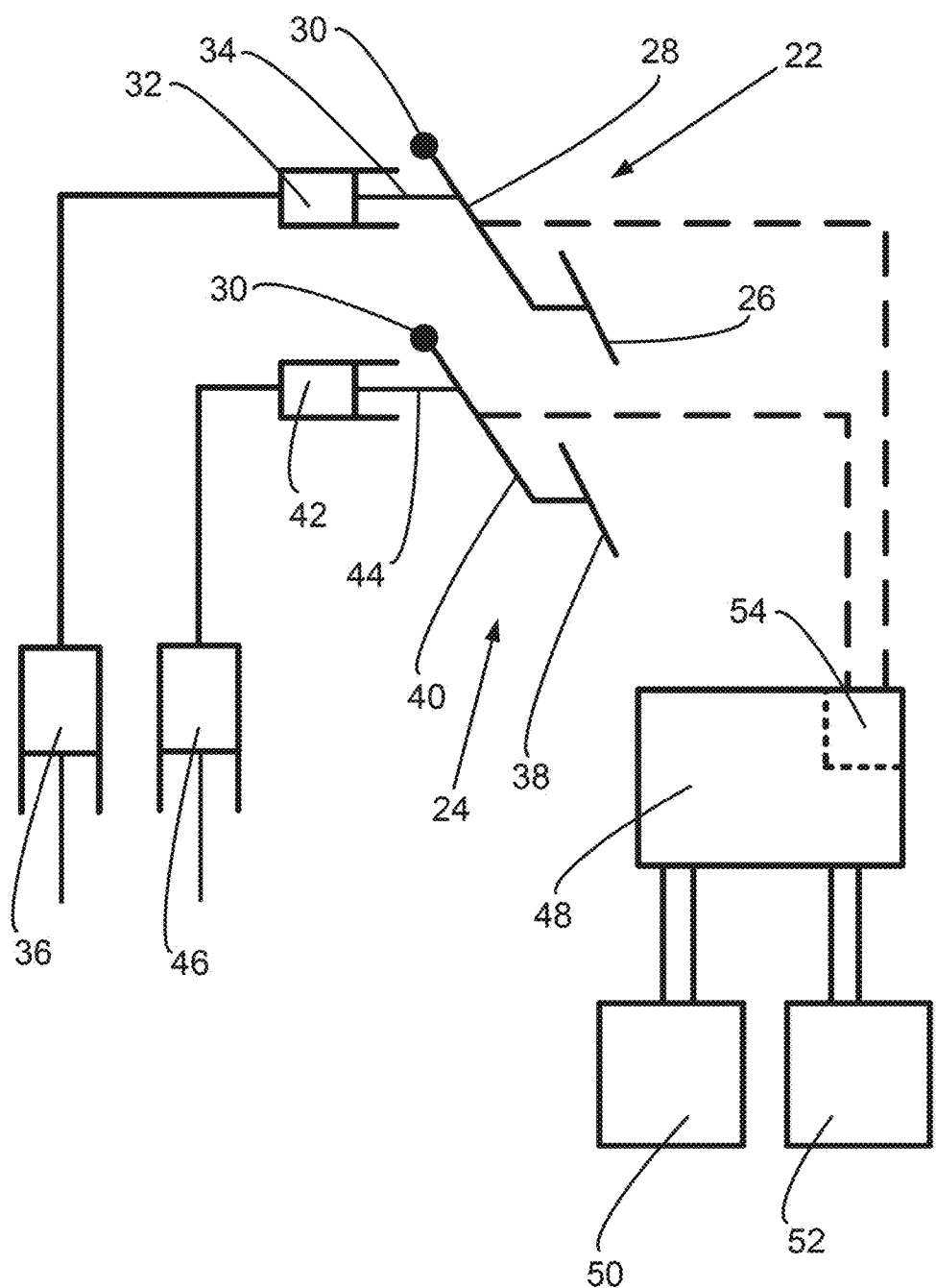
FIG. 2 is a schematic view of a steering brake system according to the invention when implemented on a tractor.

Turning to FIG. 2, an illustration of a braking system according to the invention is provided. The brake pedals 22, 24 comprise a right-hand-side brake pedal 22 and a left-hand-side brake pedal 24, which are used to control the braking of the right- and left-hand-side rear wheels 14 respectively.

The right-hand-side pedal 22 comprises a foot pad 26 arranged on a pedal body 28, the body 28 pivotably provided on a shaft or pivot pin 30. The pedal body 28 is coupled with a right-hand master cylinder 32 via pin 34, the right-hand master cylinder 32 coupled via a braking circuit with right-hand slave cylinder 36. It will be understood that the right-hand slave cylinder 36 is coupled with a brake gear (not shown) for braking the right-hand rear wheel.

Similarly, the left-hand-side pedal 24 comprises a foot pad 38 arranged on a pedal body 40, the left-hand pedal body 40 pivotably provided on shaft 30 in common with the right-hand pedal body 28. The left-hand pedal body 40 is coupled with a left-hand master cylinder 42 via pin 44, the left-hand master cylinder 42 coupled via a braking circuit with left-hand slave cylinder 46. It will be understood that the left-hand slave cylinder 46 is coupled with a brake gear (not shown) for braking the left-hand rear wheel.

Accordingly, as in known tractor braking systems, depression of the pedals 22, 24 by an operator actuates the respective master cylinders 32, 42 to create increased fluid pressure in the braking circuits, thereby actuating the slave cylinders 36, 46 to apply a braking force to the respective brake gears in a known manner.

In accordance with the invention, and as described in more detail below, the braking system illustrated in FIG. 2 is operable to detect the locking status of the brake pedals 22, 24.

The vehicle comprises an Electronic Control Unit (ECU) 48, which may be communicatively coupled with other components of the vehicle, including engine 50, and vehicle display device 52. The ECU 48 comprises a pedal lock status module 54, which is arranged to determine the locking status of the pedals 22, 24. The pedal lock status module 54 is configured to receive separate signals from both the right- and left-hand-side pedals 22, 24, and to determine whether the pedals 22, 24 are locked together or not.

Based on the determined locking status of the pedals 22, 24, the ECU 48 can be configured to regulate the operation of the engine 50. For example, if the pedals 22, 24 are detected to be unlocked, the engine 50 may be restricted to a maximum vehicle speed of 40 km/h. In addition, the ECU 48 can be configured to display to a vehicle operator using the display device 52 an indication as to the current locking status of the pedals and/or an indication of restricted vehicle operation due to unlocked pedal status.

While in FIG. 2, the pedal lock status module 54 is shown as a part of the ECU 48, arranged to receive separate signals from both the right- and left-hand-side pedals 22, 24, it will be understood that the pedal lock status module 54 may be provided as a separately-located element from the ECU 48, arranged to communicate a single locking status signal to the ECU 48. In this case, the pedal lock status module 54 may be provided local to the brake pedals 22, 24, which can allow for the installation of the pedal lock status module 54 as part of a retrofit solution which can be easily integrated into existing brake systems.

Figure 3:
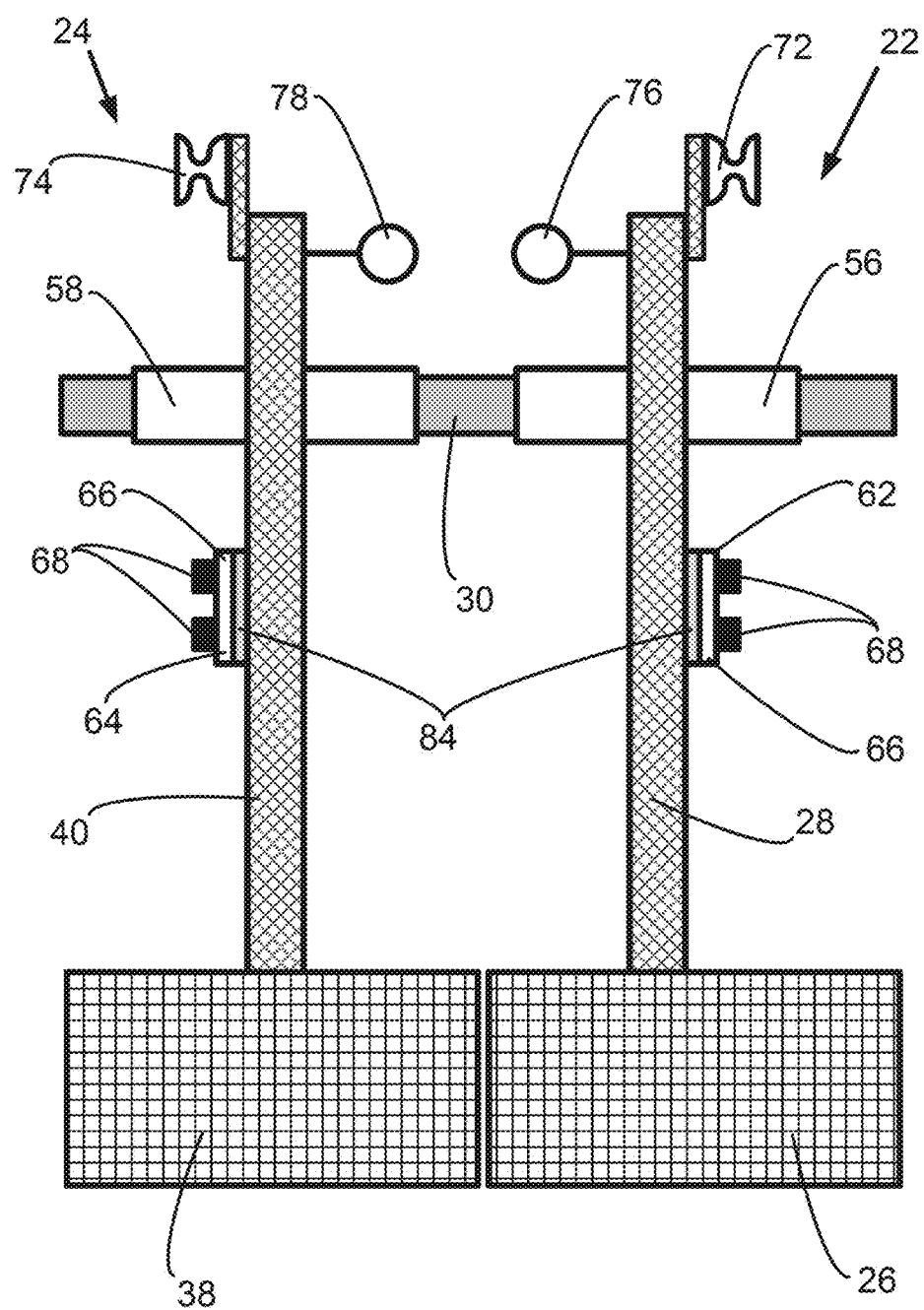
FIG. 3 is a front plan view of a steering brake system according to the invention.
Figure 4:
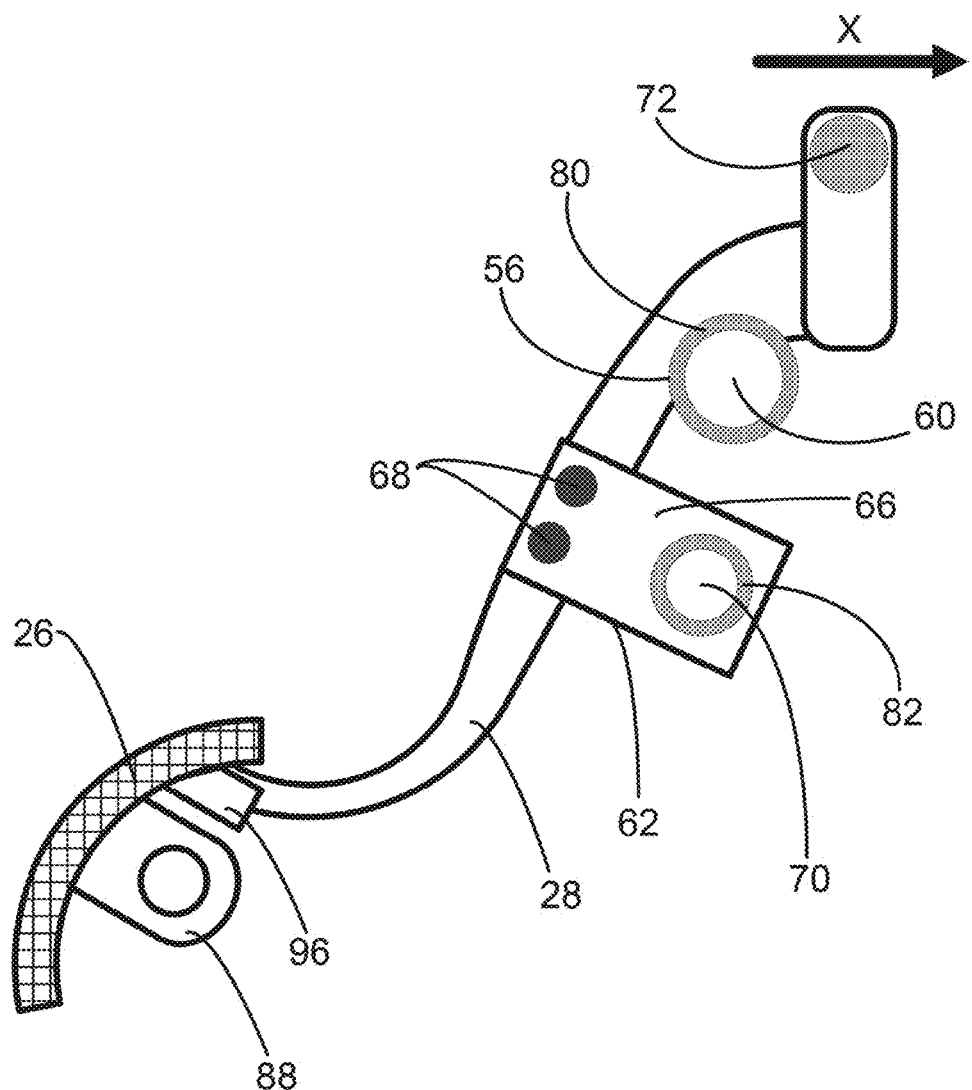
FIG. 4 is a side plan view of a pedal of the steering brake system of FIG. 3.

The right and left brake pedals 22, 24 are shown in more detail in FIGS. 3 and 4. While the illustrated embodiment shows the right and left brake pedals 22, 24 as symmetrical elements, with the side plan view of the right pedal 22 shown in FIG. 4 effectively a mirror image of the left pedal 24, it will be understood that the pedals 22, 24 may also be provided as non-symmetric elements.

At least a portion of the pedals 22, 24, and in particular the respective pedal bodies 28, 40, are formed from an electrically-conductive material, e.g. a metallic material such as iron or steel. The respective foot pads 26, 38 may be formed of an insulating material, e.g. a natural or synthetic rubber or a plastics material, provided over a base plate formed from a conductive material integral with the pedal bodies 28, 40.

As indicated in FIG. 2, the right and left pedals 22, 24 are supported on a common shaft 30. With reference to FIG. 3, left and right shaft mounting portions 56, 58 are provided as part of the pedal bodies 28, 40, the shaft mounting portions 56, 58 each comprising a through-going tubular aperture 60, FIG. 4, through which the common shaft 30 is received.

The pedals 22, 24 are further provided with respective flange mounting portions 62, 64 connected to the respective right- and left-hand pedal bodies 28, 40. The flange mounting portions 62, 64 are provided for connection of the right and left pedals 22, 24 to respective cylinder pins (34, 44, FIG. 2) for actuation of the respective master cylinders (32, 42, FIG. 2). With reference to FIG. 4, in a preferred aspect, the flange mounting portions 62, 64 each comprise a plate member 66 which is arranged to be attached to the respective pedal bodies 28, 40, e.g. using bolts 68. The plate member 66 may then be coupled with a suitable cylinder pin through any suitable connection method, e.g. a transverse rod received in an aperture 70 defined in the plate member 66.

In order to bias the pedals 22, 24 towards an at-rest position, the pedal bodies 28, 40 are arranged to be coupled with suitable biasing springs, e.g. coil springs (not shown), such that the pedals 22, 24 return to a default position when pressure is not applied to the pedals 22, 24 by an operator. In this case, respective right- and left-hand spring flanges 72,74 are provided at upper ends of the pedal bodies 28, 40. The spring flanges 72,74 comprise a channel to arranged to receive an end of respective biasing springs, e.g. a hook end of a coil spring, to generate a biasing force in the direction of arrow X, FIG. 4.

The pedals 22, 24 are each provided with a respective electric terminal 76, 78. The terminals 76, 78 are connected to the conductive pedal bodies 28, 40, such that a measure of the electrical conductivity or resistivity between the right and left brake pedals 22, 24 can be measured across the terminals 76, 78.

In order to provide an accurate reading of the conductivity, pedals 22, 24, and in particular the pedal bodies 28, 40, are arranged to be electrically isolated from the underlying vehicle chassis and frame. To insulate the pedals 22, 24 from any conductive elements present in the remainder of the vehicle, insulating material is provided at the interface between the pedal components and any other part of the vehicle. The insulating material may comprise any suitable non-conductive substance, e.g. natural or synthetic rubber, a plastics material, a ceramic material, etc.

In a first aspect, and with reference to FIG. 4, bushings 80 formed of an insulating material are provided in the through-going tubular apertures 60, such that the left and right shaft mounting portions 56, 58 are insulated from the common shaft 30.

In addition, the flange mounting portions 62, 64 are provided with insulating material to electrically isolate the pedal bodies 28, 40 from the cylinder pins 34, 44 and master cylinders 32, 42 which are provided on the vehicle chassis. In one aspect, the apertures 70 provided on the respective flange mounting portions 62, 64 may be provided with insulating bushings 82. Additionally or alternatively, insulating bushings (not shown) may be used to receive the bolts 68 in the pedal bodies 28, 40. Additionally or alternatively, the plate members 66 of the flange mounting portions 62, 64 may be formed of an insulating material, or an insulating material may be provided in the form of an insulating membrane 84, FIG. 3, arranged between the plate members 66 and the pedal bodies 28, 40.

It will be understood that the brake pedals 22, 24 may be further provided with suitable stop members (not shown) to limit the pivoting movement of the pedals within a desired range of motion.

Figure 5A:
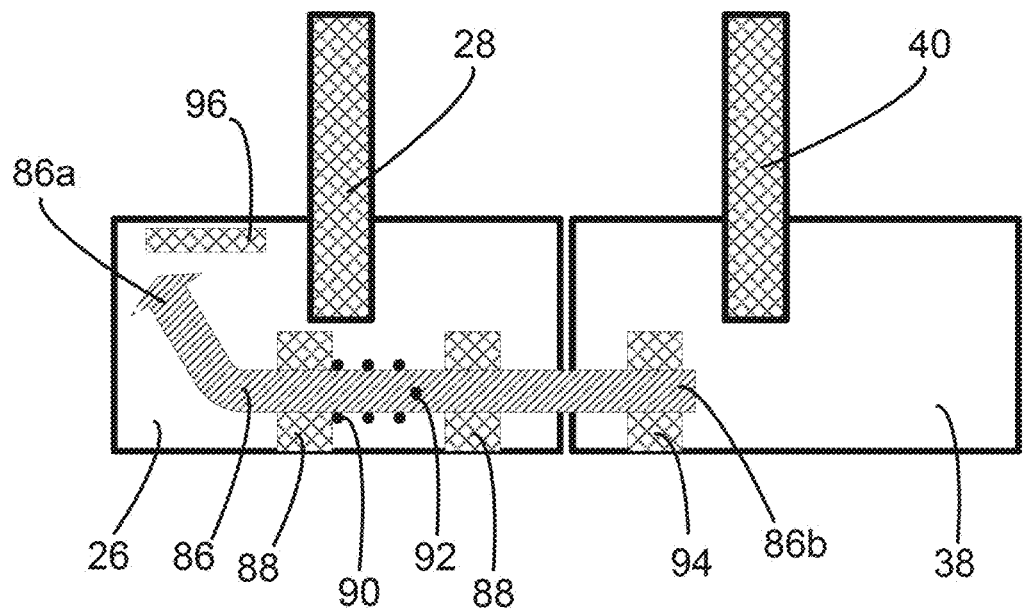
FIGS. 5A and 5B show a pair of rear views of part of the steering brake system of FIG. 3, in a locked and an unlocked state.
Figure 5B:
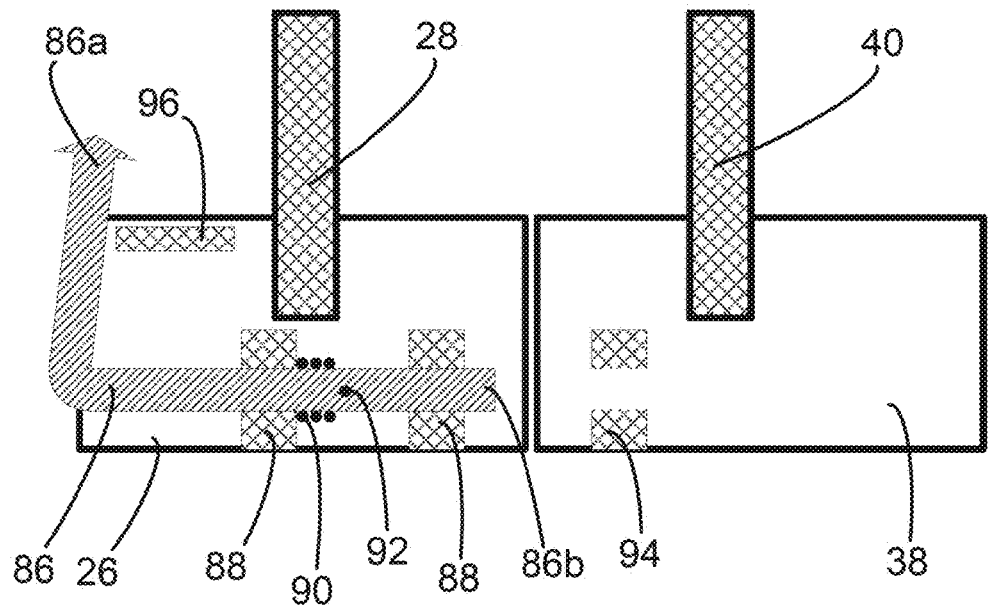

The locking mechanism for the steering brake system can be seen in the rear view of the foot pads 26, 38 shown in FIGS. 5A and 5B. The locking mechanism comprises a locking pin 86 carried on the underside of the right-hand foot pad 26. The locking pin 86 is slidably mounted to the foot pad 26, retained in two guiding slots 88 to allow transverse movement of the pin 86.

A coil spring 90 surrounds the locking pin 86 in a region enclosed between one of the guiding slots 88 and a stop 92 fitted to the pin 86. The spring 90 biases the pin 86 into an engagement with a receiving slot 94 disposed towards the edge of the left-hand foot pad 38, such that a first end 86b of the locking pin 86 is received in the receiving slot 94. When engaged, the locking pin 86 locks the right-hand foot pedal 22 to the left-hand pedal 24, so as to ensure simultaneous actuation of the right- and left-hand brakes of the vehicle, through the master-slave cylinder arrangement 32, 36, 42, 46.

The locking pin 86 can be latched in a withdrawn position wherein an extension located at the second end 86a of pin 86 is held against a stop 96 disposed on the right-hand foot pad 26 by the force of the compressed spring 90. Accordingly, an operator can selectively provide a steering brake function by engaging the pin 86 in the receiving slot 94 to lock the pedals 22, 24 together (the locked position shown in FIG. 5A), or by withdrawing the locking pin 86 from the receiving slot 94 and engaging the pin extension 86a against stop 96 to provide for separate pedal actuation (the unlocked position shown in FIG. 5B).

In order to provide a simple and effective mechanism for detecting the locking status of the pedals 22, 24, the locking pin 86 is formed from an electrically conductive material, such that engaging the pin 86 in the receiving slot 94 of the left-hand pedal 24 acts to complete an electric circuit between the pedals 22, 24. As a result, due to the electrical isolation of one or both of the pedals 22, 24 from the remainder of the vehicle chassis, a simple test for the locked or unlocked status of the foot pedals 22, 24 can be provided by measuring the electrical conductivity (or resistivity) between the right- and left-hand foot pedals 22, 24.

When the locking pin 86 is in the locked position (FIG. 5A), the electrical connection between the right- and left-hand foot pads 26, 38 results in a relatively low resistance, or high conductivity, between the left and right pedals 22, 24. Similarly, when the locking pin 86 is in the unlocked position (FIG. 5B), the electrical connection between the right- and left-hand foot pads 26, 38 results in a relatively high (or infinite) resistance, with low (or no) conductivity, between the left and right pedals 22, 24.

It will be understood that the brake pedals 22, 24 are constructed such that an electrically-conductive path is provided between the locking pin 86 and the electric terminals 76, 78. Accordingly, when the locking pin 86 is in the locked position, an electric path of a quantifiable resistance is formed between the pedals 22, 24, the conductivity of which is measurable across the terminals 76, 78.

In one aspect, it will be understood that the guiding and receiving slots 88, 94 are formed from a conductive material, and are integrally formed with the foot pads 26, 38 and the pedal bodies 28, 40 to form respective conductive paths in both the right and left pedals 22, 24. Additionally or alternatively, supplemental electrical contact members (not shown) may be provided on one of both of the foot pads 26, 38, and which are in contact with the locking pin 86 on one or both of the pedals 22, 24 when the locking pin 86 is in the locked position, to form an electrical path between the terminals 76, 78 via the locking pin 86.

Due to the location of the foot pads 26, 38 of the brake pedals 22, 24 in the lower area of the vehicle cab 18, there is a risk that any contact formed between the locking pin 86 and the conductive elements of the left foot pads 38 (such as via the receiving slot 94 and/or a supplemental electrical contact member) may become impeded or blocked due to accumulation of dirt or mud. Accordingly there is a need for a self-cleaning contact mechanism, to ensure that a robust electrical contact is obtained across the pedals 22, 24 when the locking pin 86 is in the locked position.

Figure 6A:
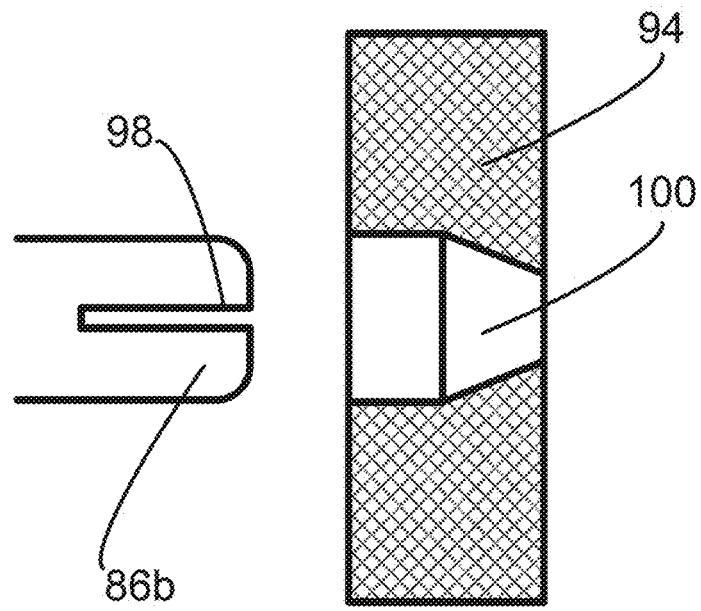
FIGS. 6A and 6B show a pair of cross-sectional views of a portion of the steering brake system of FIG. 3, in a locked and an unlocked state.
Figure 6B:
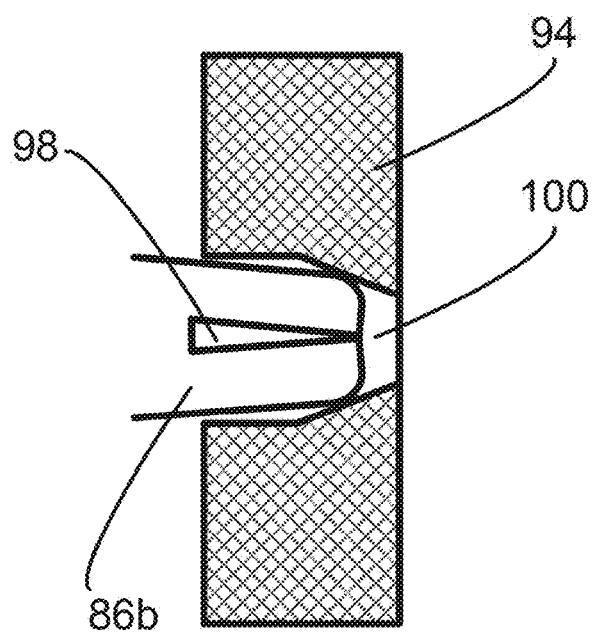

With reference to FIGS. 6A and 6B, a pair of cross-sectional views of a contact between an end 86b of a locking pin 86 and a corresponding receiving slot 94 according to an embodiment of the invention are shown. A notched cut 98 is provided in the end 86b of the locking pin 86, which allows for the end 86b of the pin 86 to be compressed. In addition, at least a portion of the internal surface of the receiving slot 94 comprises a chamfered surface 100, which tapers inwardly such that the receiving slot 94 narrows in the direction away from the locking pin 86. As a result, the pin 86 can be provided in an unlocked position, shown in FIG. 6A where the end 86b of the pin is in an uncompressed state, and a locked position, shown in FIG. 6B, wherein pin 86 is inserted into the receiving slot 94 such that the end 86b of the pin 86 is compressed by the chamfered internal surface 100 of the receiving slot 94.

The mechanical compression of the end 86b of the pin 86 during insertion ensures that a secure mechanical and electrical connection is formed between the receiving slot 94 and the pin 86. The compression of the end 86b of the pin 86 provides a self-cleaning effect, in that any accumulated dirt or debris is cleared away from the connection between the pin 86 and the receiving slot 94 during insertion.

The notched cut 98 may be provided as a simple transverse cut formed in the end of the locking pin 86, but it will be understood that other cut shapes may be used, e.g. a cross-cut or star-shaped cut. In addition, while in FIGS. 6A and 6B the chamfered surface is formed as part of the receiving slot 94, it will be understood that the chamfered surface may be provided as part of a supplemental electrical contact member on the left foot pad 38.

While the above embodiment illustrates a brake system wherein both the right- and left-hand-side pedals 22, 24 are electrically isolated from the rest of the vehicle, it will be understood that only one of the pedals 22, 24 may be insulated from the vehicle frame, with the other of the pedals in electrical contact with other conductive elements of the vehicle. In this case, a determination of the locking status of the pedals 22, 24 may be made by measurement of the electrical conductivity between the electrically-isolated pedal and the other pedal or connected chassis frame.

It will be understood that the pedal lock status module 54 may be arranged to perform a relatively simple measurement of the resistivity or conductivity seen across the terminals 76, 78 to determine the locking status of the pedals 22, 24. While the embodiment of FIG. 3 shows the terminals 76, 78 provided on the pedal bodies 28, 40, it will be understood that the system may further comprise conductive elements, e.g. electrical wires, connected to the pedals 22, 24 such that a resistivity measurement may be performed at a separate location to the pedals 22, 24, e.g. adjacent a centralised ECU 48.

In a further alternative, while the embodiment described above comprises brake pedals 22, 24 partly formed from conductive materials to form a portion of a conductive path between the two terminals 76, 78, it will be understood that conductive elements, e.g. electrical wires, may be used to form the conductive path between the locking pin 86 and the terminals 76, 78, e.g. by electrical connection with conductive guiding and receiving slots 88, 94, and/or with supplemental electrical contact members. The use of electrical wires to form such a conductive path for the measurement of the resistance between the pedals 22, 24 allows for ease of use of the system of the invention as a retrofit solution, without significant alteration of existing brake pedals.

As an open circuit between the pedals 22, 24 results in an infinite electrical resistance, the pedal lock status module 54 may comprise a relatively simple conductivity measurement device, operable to determine a relatively high resistivity, e.g. an infinite resistance, or at least greater than 100 k$\Omega$-1 M$\Omega$, as indicative of an open circuit between the pedals 22, 24. Similarly, the pedal lock status module 54 may be arranged to determine a relatively low resistivity measurement, e.g. less than 1 k$\Omega$, as indicative of a closed circuit between the pedals, signifying that the locking pin 86 engages both the right and left pedals 22, 24.

In a further aspect of the invention, the pedal lock status module 54 may be arranged to determine if the measured electrical resistance varies over time while the pedals are locked together, or the measured electrical resistance is measured at an unexpected level. Accordingly, the pedal lock status module 54 may be arranged to determine that the braking system is not operating in an expected manner, and to communicate such a status to the ECU 48. In such cases the ECU 48 may indicate to an operator via the display 52 that a service operation or a cleaning of the braking system is required.

Accordingly, a system for the detection of the locked or unlocked status of steering brakes is provided, which can be relatively inexpensive and easy to implement and maintain. In addition, as the system relies on the inherent conductivity of brake pedal construction, existing brake systems may be relatively easily adapted to incorporate the described system as a retrofit solution.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A steering brake system for a vehicle, the steering brake system comprising:
   adjacent first and second pedals;
   a locking pin slidably mounted on said first pedal, said locking pin arranged to travel between an unlocked position where the locking pin is carried on said first pedal and a locked position where the locking pin extends from said first pedal into engagement with said second pedal to lock said first and second pedals together,
   wherein said first and second pedals and said locking pin are at least partially formed from a conductive material, such that the locking pin completes a conductive path between a conductive portion of said first pedal and a conductive portion of said second pedal when in said locked position, and
   wherein the steering brake system further comprises a pedal lock status module arranged to determine the locked or unlocked position of the locking pin by monitoring the electrical resistance between the conductive portions of said first and second pedals.

2. The steering brake system of claim 1, wherein the first and second pedals comprise respective first and second pedal bodies, and wherein the pedal bodies are formed from a conductive material.

3. The steering brake system of claim 1, wherein at least one of the first and second pedals are arranged to be electrically isolated from a vehicle to receive the steering brake system.

4. The steering brake system of any claim 1, wherein the pedal lock status module is arranged to generate an output signal indicating a locked or unlocked status of the steering brake system, wherein the output signal is generated based on the level of electrical resistivity measured across the conductive portions of said first and second pedals, wherein a relatively high or infinite resistivity indicates an unlocked system, and wherein a relatively low resistivity indicates a locked system.

5. The steering brake system of claim 1, wherein the steering brake system comprises at least one mounting portion to allow at least one pedal of the steering brake system to be mounted to a vehicle, wherein said mounting portion comprises an electrically-insulating component to electrically isolate said at least one pedal from the vehicle.

6. The steering brake system of claim 1, wherein at least one of said first and second pedals comprises an insulating bushing received in an aperture defined in said at least one pedal, wherein said insulating bushing allows for said at least one pedal to be mounted to a vehicle.

7. The steering brake system of claim 1, wherein the steering brake system is arranged to couple with at least one biasing spring provided on a vehicle such that said at least one biasing spring acts to bias at least one of said first and second pedals to an at-rest position, wherein the steering brake system comprises a connector arranged to couple with said at least one biasing spring, said connector formed of an insulating material.

8. The steering brake system of claim 1, wherein the steering brake locking system comprises first and second terminals for measuring electrical resistance, the first terminal electrically connected to a conductive portion of said first pedal, the second terminal electrically connected to a conductive portion of said second pedal.

9. The steering brake system of claim 1, wherein the first pedal comprises at least one guide slot, wherein said locking pin is slidably mounted in said at least one guide slot to allow transverse movement of the locking pin.

10. The steering brake system of claim 1, wherein the second pedal comprises at least one receiving slot, wherein a first end of said locking pin is received in said at least one receiving slot when in said locked position.

11. The steering brake system of claim 10, wherein a notched cut is provided in said first end of said locking pin, such that the first end of said locking pin is compressed when received within the said at least one receiving slot.

12. The steering brake system of claim 10, wherein said at least one receiving slot comprises a chamfered surface facing the said first end of the locking pin, the chamfered surface dimensioned to compress the first end of locking pin when received within the said at least one receiving slot.

13. A vehicle, comprising a steering brake system as claimed in claim 1.

14. The vehicle of claim 13, wherein the vehicle comprises an engine control unit (ECU), the ECU operable to control the maximum speed of said vehicle dependent on the locking status of said first and second pedals.

15. The vehicle of claim 13, wherein the vehicle comprises at least one display unit, the ECU arranged to display the determined locking status of the pedals on the display unit.

* * * * *